United States Patent [19]

Voïnov et al.

[11] 3,883,768
[45] May 13, 1975

[54] ELECTROLYTIC LIGHT SOURCE
[75] Inventors: Michel Voïnov; James Dunnett, both of Geneva, Switzerland
[73] Assignee: Battelle Memorial Institute, Carouge, Geneva, Switzerland
[22] Filed: Nov. 12, 1973
[21] Appl. No.: 414,825

[30] Foreign Application Priority Data
Nov. 13, 1972 Sweden .............................. 16470/72

[52] U.S. Cl. .................. 313/358; 204/57; 204/131; 313/483
[51] Int. Cl. .......................................... H01j ; H01k
[58] Field of Search ....... 313/358, 483; 204/59, 131

[56] References Cited
UNITED STATES PATENTS

| | | | |
|---|---|---|---|
| 2,765,419 | 10/1956 | Roberts............................ | 313/358 X |
| 2,791,723 | 5/1957 | Nagy et al....................... | 313/358 X |
| 2,809,316 | 10/1957 | Jeges............................... | 313/358 X |
| 2,866,118 | 12/1958 | Mager.............................. | 313/358 X |
| 3,371,243 | 2/1968 | Bramley.......................... | 313/358 X |
| 3,391,068 | 7/1968 | Rauhut ............................. | 313/358 |
| 3,403,296 | 9/1968 | Zweig .............................. | 313/358 X |
| 3,654,525 | 4/1972 | Maricle............................. | 313/358 |

*Primary Examiner*—Saxfield Chatmon, Jr.
*Attorney, Agent, or Firm*—Karl F. Ross; Herbert Dubno

[57] ABSTRACT

Two electrodes spaced apart by less than 1 mm, one or both of them being transparent, are separated by a thin dielectric frame such as a Teflon film so as to define a narrow chamber filled with an ionically conductive liquid including an electrolyte and a dissolved organic fluorescent compound. Upon the application of a d-c voltage across these electrodes, cations and anions are formed which instantly recombine and which interact with the fluorescent compound to provide sustained luminescence.

19 Claims, 2 Drawing Figures

PATENTED MAY 13 1975

3,883,768

ELECTROLYTIC LIGHT SOURCE

FIELD OF THE INVENTION

Our present invention relates to an electrolytic light source of the type wherein a fluorescent material is excited by the passage of an electric current through an ionizable medium having that material dissolved therein.

BACKGROUND OF THE INVENTION

It is known, e.g. from British patent No. 1,066,928, to dissolve an organic fluorescent compound in an inert solvent together with an ionizable solute serving as an electrolyte and to subject this electrolytic solution to an alternating current of the usual network frequency (60 Hz) between electrodes energized with about 3 volts, each electrode acting alternately as an anode and a cathode. The fluorescent compound may be oxidized in the vicinity of a positively driven electrode (anode), thereby acting as a cation radical, and will then be excited by reduction as the electrode goes negative and becomes a cathode; alternatively, it may be reduced by the cathodic excursion of an adjoining electrode to act as an anion radical with subsequent oxidation and excitation during the anodic excursion. In either case, the compound is photoemissive only during half a cycle so that the overall yield in luminous energy is relatively low. Moreover, the alternating positive and negative polarization of the electrodes adversely affects the electrode material, even in the case of a noble metal such as platinum, as the repeated oxidations and reductions weaken its structure and lead to the contamination of the electrolyte with detached particles.

OBJECTS OF THE INVENTION

It is, therefore, an object of our present invention to provide an improved electrolytic light source of the general type described which avoids the aforestated inconveniences.

A related object is to provide a light source which is of greater versatility, as far as incorporation into structures of various shapes is concerned, then conventional light emitters such as incandescent or fluorescent lamps and which compares favorably in price and luminous efficiency with such more recent developments as light-emissive diodes.

It is also an object of our invention to provide a light source of this nature which can be operated by readily available power supplies such as low-voltage electric batteries.

SUMMARY OF THE INVENTION

We have discovered, in conformity with our present invention, that a fluorescent material dissolved in an ionically conductive liquid will continuously emit luminous energy if that liquid is confined in a narrow chamber between two closely spaced electrodes energized with direct current; an ionizable constituent of such liquid then releases cations and anions which instantly recombine, owing to the small distance between the electrodes, and by their interaction excite the fluorescent material to emit light.

Thus a light source embodying our invention comprises a pair of electrodes with broad parallel surfaces closely confronting each other to define, together with nonconductive spacing means, a fluidtight chamber filled with such a liquid; with at least one of these electrodes optically transparent, their energization by a d-c current supply generates light which is radiated to the outside.

We have further found that, for efficient operation, the spacing of the two parallel electrode surfaces should not be greater than about 50 microns. These surfaces need not necessarily be planar, although this will be convenient in many instances, but could be curved spherically, cylindrically or in some other manner as long as the conditions of closeness and parallelism are maintained.

In order to prevent the deterioration of the electrodes, they should be electrochemically inert in the system in which they are employed. Thus, the positively charged electrode or anode should consist (at least along its surface confronting the cathode) of an electrolytically nonoxidizable substance, specifically an oxide of a metal such as tin. Conversely, the negatively charged electrode or cathode should consist (again at least on the side confronting the other electrode) of an electrolytically nonreducible substance, specifically a noble metal such as gold. In the case of a transparent electrode, these nonreactive substances may be applied as a thin layer — advantageously by vapor deposition — to the surface of a light-transmissive support such as a glass plate; the layers are preferably less than 1 micron in thickness so as to be easily penetrated by the emitted light.

The anions and cations stimulating photoemission are not necessarily contributed by the luminescent material itself. Thus, our invention is applicable to a wide variety of organic compounds, fluorescent or not, capable of oxidizing at the anode and/or reducing at the cathode, some of which have been listed in the above-identified British patent. Of particular interest in this connection are rubrene (5,6,11,12-tetraphenylnaphthacene) and 9,10-diphenylanthracene.

A further intensification of the luminous output can be realized, pursuant to another feature of our invention, if a combination of at least two synergistically interacting organic compounds are used as the fluorescent material. One of these compounds may be thianthrene, or diphenylenedisulfide, used with 9,10-diphenylanthracene alone or with both of the two aforementioned compounds.

BRIEF DESCRIPTION OF THE DRAWING

The above and other features of our invention will now be described in detail with reference to the accompanying drawing in which.

SPECIFIC DESCRIPTION

Figure 1:
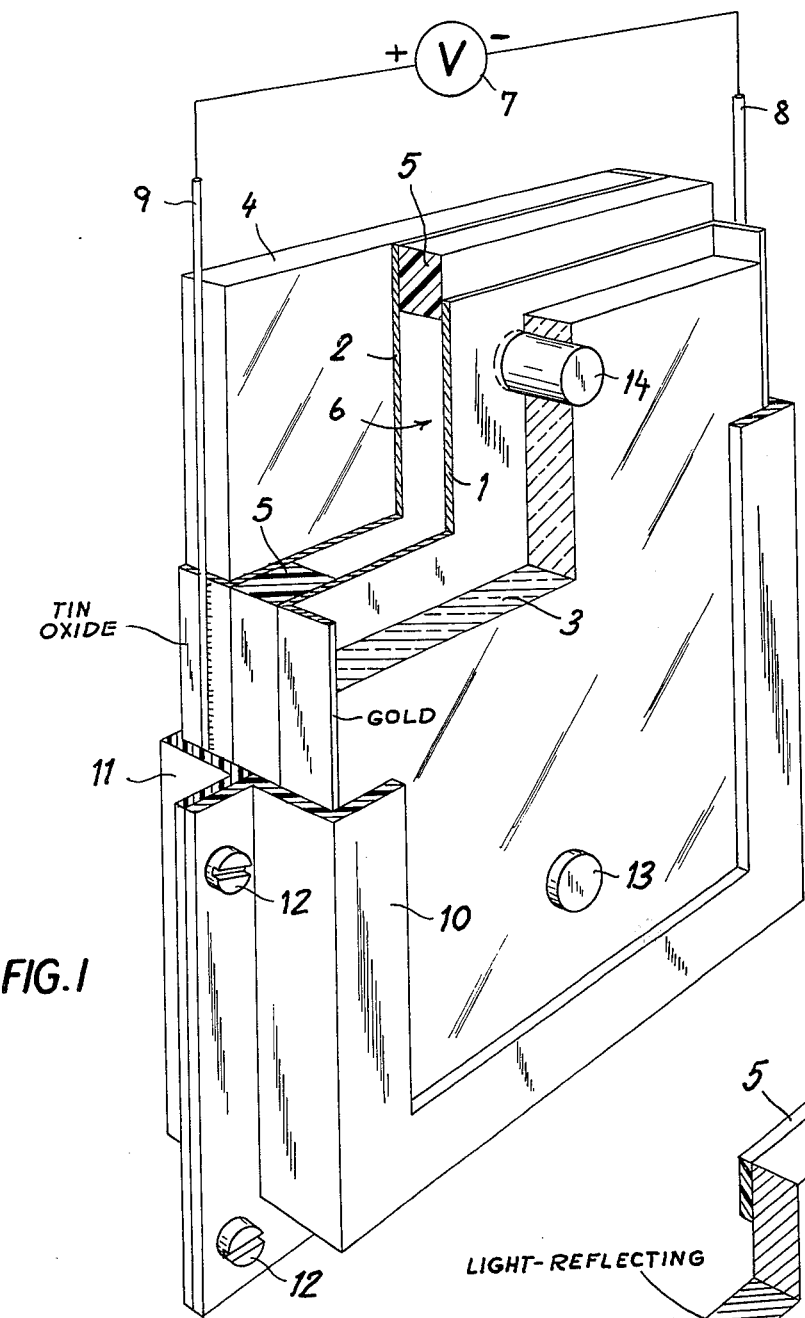
FIG. 1 is a somewhat diagrammatic perspective view (with parts broken away) of an electrolytic cell operating as a light source in accordance with our invention.

The embodiment of our invention shown in FIG. 1 comprises a pair of closely juxtaposed rectangular electrodes, i.e. a cathode 1 and an anode 2, formed as thin coatings on respective supporting plates 3, 4 of glass. A dielectric frame 5, e.g. of polytetrafluoroethylene (Teflon), is inserted between opposite marginal zones of the two electrodes to keep them spaced apart, this coating extending also around the edges of the glass plates to facilitate the connection of respective supply terminals 8, 9 thereto. These terminals, which may be secured to the coatings with highly conductive solder, are connected across a direct-current supply 7, such as an electric battery with a voltage of about 2.7 – 3 V, with the proper polarity to make the electrode 1 negative with reference to the electrode 2. The frame 5, whose thickness has been greatly exaggerated in the drawing, defines with the electrodes 1, 2 a fluidtight chamber 6 filled with an ionically conductive solution as more fully described below; this frame may be cut from Teflon film of, say, $25\mu$ thickness and may be cemented to the electrode surfaces so as to maintain them separated by a small fraction of a millimeter.

The electrode structures 1, 3 and 2, 4 are held together, under a certain clamping pressure, by two flanged outer frames 10, 11 that are fastened to each other by screws 12. One of these electrodes, here the cathode 1, 3, is formed with apertures which are normally closed by plugs 13, 14 and can be used to fill the chamber 6.

Suitable dimensions for the plates 3 and 4 are, for example, 25 × 40 × 5 mm. The conductive coatings 1 and 2, consisting respectively of gold and of tin oxide, are advantageously formed by vapor deposition and have thicknesses smaller than $1\mu$. The tin oxide is advantageously doped with antimony oxide to reduce its resistance to less than 50 $\Omega/cm^2$; this corresponds to a light transmissivity of more than 70%.

Figure 2:
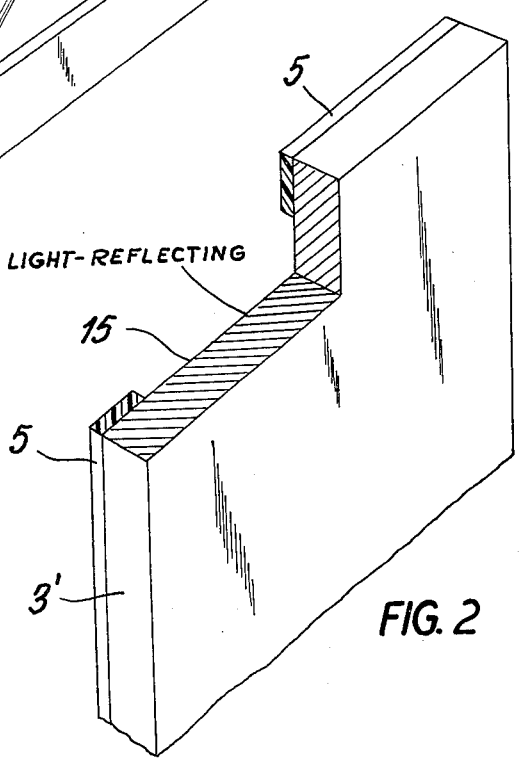
FIG. 2 is a fragmentary view similar to FIG. 1, illustrating a partial modification.

As illustrated in FIG. 2, one of the electrodes (here the cathode) may be made of opaque material in the form of a solid metal plate 3' with a highly polished, light-reflecting surface 15 confronting its transparent mate. Such a cell can be used as a unidirectional light emitter, in contradistinction to the bidirectional emitter of FIG. 1, with the reflector 15 intensifying the radiation traversing the anode.

The Teflon film 5 may be replaced by other dielectric material, having a resistivity greater than $10^3$ ohm-cm, which can be produced in the requisite thickness of about $50\mu$ or less. Metals other than gold, satisfactory for use as a cathode, include copper, silver, iron and alloys thereof. Oxides of metals other than tin, e.g. of indium or titanium, may be utilized for the anode, advantageously with suitable doping to improve their conductivity. The anode coating 2 could be applied by sputtering or any other suitable process.

The liquid filling the chamber 6 consists of:

a. an electrolytically inert solvent nonreactive with electrodes 1 and 2;

b. an ionizable solute, e.g. an inorganic or organic salt, capable of serving as an electrolyte by dissociation into cations and anions; and c. one or more fluorescent organic compounds excitable to emit luminous radiation.

A preferred solvent is benzonitrile, in combination with tetrabutyl ammonium perchlorate as the electrolyte. Other suitable solvents, liquid at ambient temperatures, include tetrahydrofuran dioxane, glyme (1,2-dimethoxyethane) and chlorinated alkanes.

There are a number of electrolytes known in the art, both organic and inorganic, which could be used in lieu of tetrabutyl ammonium perchlorate; some of them are listed in the above-identified British patent. In general, their concentration in the solvent should be so chosen as to establish a conductivity of the solution between about $10^{-3}$ and $10^{-1}$ mho-cm$^{-1}$ (preferably upward of $10^{-2}$ mho-cm$^{-1}$). This concentration normally ranges between $10^{-2}$ and $10^{-1}$ mole per liter. If two or more electro-active compounds of different work functions (at least one of them fluorescent) are present in the solution, a synergistic effect leading to intensified light emission may be observed. This is especially true if one of the compounds is thianthrene, the other being 9,10-diphenylanthracene alone or supplemented with rubrene.

The preferred classes of organic luminescent compounds suitable for use in a luminescent cell according to our invention comprise aromatic hydrocarbons and their derivatives, heterocyclic compounds and their derivatives, complexes of metals with organic ligands such as chelates, organometallic compounds, dyes, and organic groupings of molecules acting as electron donors and electron acceptors; such groupings include charge-transfer complexes as well as excimers and exciplexes emitting light upon their dissociation.

Naturally, the choice of a fluorescent compound or a combination of several such compounds determines the wavelength of the emitted light.

EXAMPLE

Chamber 6 is filled with a liquid containing benzonitrile as a solvent, with 0.008 mole per liter of rubrene and 0.06 mole per liter of tetrabutyl ammonium perchlorate dissolved therein. The electrodes 1 and 2, spaced 0.0025 mm apart, are energized from battery 7 with 3 V to generate an ionic current flow of 7 amps/m$^2$ whereby the rubrene is oxidized at the anode and reduced at the cathode. The resulting cation and anion radicals, as well as the ions released by the electrolyte, promptly recombine and by their interaction cause the emission of light with an intensity of 50 lumens /m$^2$. The conductivity of the liquid exceeds $10^{-3}$ mho-cm$^{-1}$.

Naturally, the illustrated cell may be modified in various ways as to both shape and size; electrodes considerably smaller or many times larger (e.g. with dimensions on the order of meters) than those described above could be employed. However, the close spacing of the electrode surfaces should be maintained in all instances. In order to insure reliable operation and a long service life, the constituents of the liquid should be as pure as possible and leakage should be prevented, e.g. by potting. The usual purification techniques such as distillation, recrystallization and sublimation may be used.

Batteries or rectifiers with output voltages of up to about 5 V can be utilized as the power supply 7.

Among the many fields of use for an electrolytic light source according to our invention, the following may be mentioned:

Portable lamps, luminous buoys and beacons, traffic signals, illuminated signs (panels, clocks, dashboards, alphanumerical displays), room lighting, luminous markers, television, toys and novelties.

The emitted light is uniform over the entire surface of the transparent electrode or electrodes; its intensity can be controlled or modulated by varying the applied voltage.

We claim:

1. An electrolytic light source comprising:

a pair of electrodes with broad parallel surfaces closely confronting each other, at least one of said electrodes being optically transparent;

nonconductive spacing means holding said electrodes apart by a distance of not more than about 50 microns and forming therewith a fluidtight chamber;

an ionically conductive liquid in said chamber including a fluorescent material dissolved therein; and a supply of direct current for placing across said chamber a continuous voltage difference of not more than about 5 volts sufficient to ionize a constituent of said liquid with release of cations and anions whose interaction induces the emission of luminous energy by said fluorescent material, said electrodes respectively forming an anode and a cathode connected across said source.

2. A light source as defined in claim 1 wherein said liquid comprises an electrolytically inert solvent for said fluorescent material, said solvent being nonreactive with said electrodes.

3. A light source as defined in claim 2 wherein said liquid further contains an ionizable solute capable of furnishing cations nonreactive with said electrodes.

4. A light source as defined in claim 3 wherein said solvent is benzonitrile, said solute being tetrabutyl ammonium perchlorate.

5. A light source as defined in claim 3 wherein said fluorescent material includes at least one organic compound reducible at said cathode and oxidizable at said anode.

6. A light source as defined in claim 5 wherein said compound is rubrene or 9,10-diphenylanthracene.

7. A light source as defined in claim 3 wherein said fluorescent material comprises two synergistically interacting organic compounds reducible at said cathode and oxidizable at said anode.

8. A light source as defined in claim 7 wherein one of said compounds is thianthrene.

9. A light source as defined in claim 8 wherein the other of said compounds is 9,10-diphenylanthracene.

10. A light source as defined in claim 9 wherein said fluorescent material further includes rubrene.

11. A light source as defined in claim 1 wherein said electrodes are flat plates, said spacing means comprising a dielectric film inserted between opposite marginal zones of said electrodes and framing said chamber.

12. A light source as defined in claim 11 wherein said film consists of polytetrafluoroethylene.

13. A light source as defined in claim 1 wherein said transparent electrode comprises a glass plate provided with a thin light-transmissive conductive coating on the surface confronting the other electrode.

14. A light source as defined in claim 13 wherein said coating has a thickness less than one micron.

15. A light source as defined in claim 1 wherein one of said electrodes is an opaque plate with a reflective surface confronting the other electrode.

16. A light source as defined in claim 1 wherein said cathode consists, at least along its surface confronting said anode, of an electrolytically nonreducible substance.

17. A light source as defined in claim 16 wherein said nonreducible substance is gold.

18. A light source as defined in claim 1 wherein said anode consists, at least along its surface confronting said cathode, of an electrolytically nonoxidizable substance.

19. A light source as defined in claim 18 wherein said nonoxidizable substance is tin oxide.

* * * * *

UNITED STATES PATENT AND TRADEMARK OFFICE
CERTIFICATE OF CORRECTION

PATENT NO. : 3,883,768
DATED : 13 May 1975
INVENTOR(S) : Michel VOINOV, James DUNNETT It is certified that error appears in the above-identified patent and that said Letters Patent are hereby corrected as shown below:

In the heading, line [30], for "Sweden" read -- Switzerland -- .

Signed and Sealed this twenty-fifth Day of November 1975

[SEAL]

Attest:

RUTH C. MASON
Attesting Officer

C. MARSHALL DANN
Commissioner of Patents and Trademarks